INVENTOR.
HOWARD S. WEAVER
BY John A. Harvey
ATTORNEY

INVENTOR.
HOWARD S. WEAVER
BY John A. Harvey
ATTORNEY

United States Patent Office 3,180,935
Patented Apr. 27, 1965

3,180,935

HIGH SPEED PULSE REPEATER

Howard Shanklin Weaver, 70 Morris Road, Tenafly, N.J.

Filed Feb. 20, 1962, Ser. No. 174,568
14 Claims. (Cl. 178—70)

Figure 1:
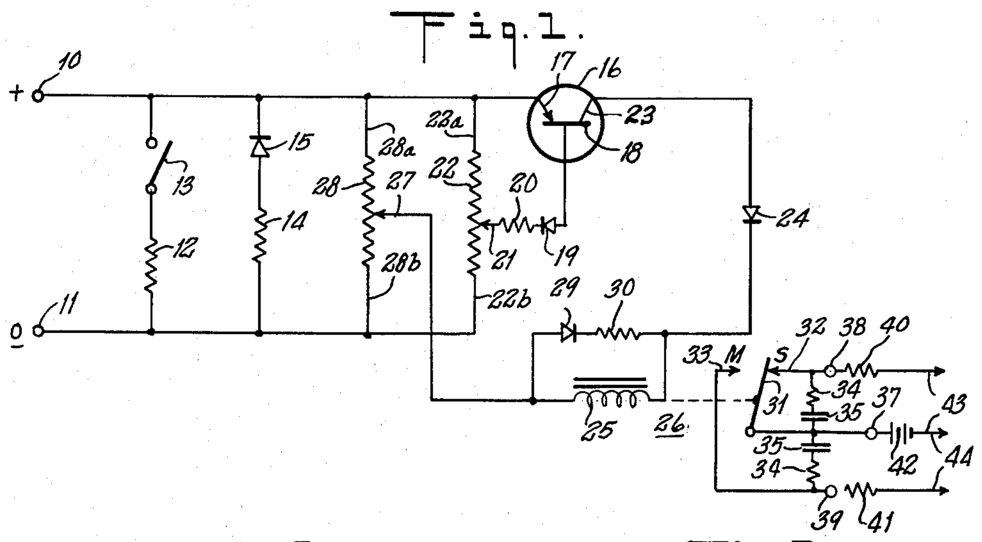

The present invention relates to electrical current repeaters and, particularly, to repeaters for translating a pulsating electrical current from one electrical circuit to another while maintaining the circuits electrically isolated from one another. While the invention has utility in numerous and diverse applications, it has particular utility in high speed telegraph applications and will be described in that connection.

Repeater devices heretofore employed in telegraph systems have been either of the electronic or electro-mechanical device. The electro-mechanical repeater, commonly known as a relay, is often preferred for reasons of operational stability, reliability, low operating and standby costs, and the ease with which electrical energy may be repeated from one electrical circuit to another while maintaining electrical isolation between the circuits. Electro-mechanical relays have an operating solenoid which is directly energized by pulsating electrical signal currents flowing in the telegraph line circuit and have a movable electrical contact (commonly called a "tongue") actuated by the solenoid and engaging either of two stationary contacts. The fixed and movable contacts control the electrical continuity of one or a pair of electrical circuits forming extensions of the telegraph circuit or extending to control telegraph receiving equipments.

Alphanumeric characters are transmitted through telegraphic circuits as coded groups of sequential mark and space code bits. A mark code bit conventionally is transmitted as a current pulse of given electrical polarity, and a space code bit is identified by the absence of a current pulse (the "neutral" telegraph system) or by a current pulse having opposite polarity to the mark current pulses (a "polar" telegraph system).

Electro-mechanical relays have heretofore utilized either a physical spring to bias the movable tongue contact to one position in which it engages one of two fixed contacts or have utilized a separate bias winding energized with a unidirectional current to accomplish the same resulting closure of the tongue contact. Still another form of relay uses the magnetic force of fixed magnets acting on the tongue, with a force attraction opposite to that which acts upon the tongue when the signal winding is energized. An undesirable characteristic of all of the conventional magnetically biased and spring biased electro-mechanical relays is that a given value of mark current (for example, approximately 70% of the maximum signal current) is required to move the tongue contact into engagement with the fixed mark contact whereas an appreciably lesser value of mark current (for example, approximately 33% of the maximum signal current) will maintain this transferred position of the tongue contact. If such a relay is energized from a signal source supplying pulses of perfectly rectangular waveform having zero rise time and zero fall time, the pulse repeated at the relay contacts will equal the duration of the applied signal pulse minus the actual tongue transit time from space to mark position and vice versa. In many practical applications, rectangular waveform signal pulses applied to a transmission line appear at the remote end of the line with substantially degraded waveform due to the inherent inductive, resistive, and capacitive impedance components of the line and ancillary equipment connected in circuit in the line. Thus a transmitted signal pulse generated with infinitely steep leading and lagging edges may be received at the remote end of the line with appreciably longer values of rise and fall times. By reason of the previously mentioned higher value of current required to transfer the tongue contact into engagement with the fixed mark contact as contrasted with the appreciably lower value of current which will maintain the tongue contact in transferred position, signal pulses of degraded waveform as last described cause the pulse repeated at the relay contacts to have a pulse duration appreciably different from the signal pulse as originally generated and this, of course, substantially unbalances the desired equality of successive mark and space intervals.

Compensation for these undesirable characteristics of the conventional electro-mechanical relay have heretofore required careful adjustment of the tongue contact spring bias and/or careful adjustment of the value of electrical bias current or careful adjustment of the bias force provided by magnetic bias magnets, and these adjustments usually must be made concurrently with careful adjustment of fixed contact spacings and/or the amplitude of signal currents and a particular application may often require the use of special wave shaping filters inserted between the transmission line and the relay. These adjustments are all mutually interdependent, and once made will enable satisfactory operation so long as there is no change in any operating condition or any change in any one of the mutually interdependent adjustments which prevailed at the time of calibration. This is not always easy of accomplishment in practice due to variation of the maximum to miniumum signal levels prevailing from time to time as affected by the leakage of current from one transmission line conductor to ground or to another conductor caused by poor insulation of the conductors, by engagement of the conductors with foliage, by changes of weather conditions as between wet and dry periods, or by salination or other conductive deposits on the transmission lines or associated equipment. Since the transmission line inherently has an appreciable value of resistance and large values of distributed capacitance, changes between wet and dry weather conditions will particularly affect the line distributed capacitance and thus cause the line, by charging or discharging more slowly, substantially to alter the voltage and current levels and pulse waveforms supplied to electro-mechanical relays connected at intermediate points and to the terminal end of the line. All of these conditions aggrevate the relatively poor operating characteristics of conventional electro-mechanical relays and give rise ot the need for constant maintenance and supervision of current levels in the transmission system, to frequent readjustment of relay contact spacings and bias adjustments, and the like, to maintain proper timing ratio of the mark and space characteristics at the relay operating contacts.

It is very often required that a number of electro-mechanical relays be connected in series in a transmission line at various points to monitor or repeat the signal received by each relay to another transmission line device or signal receiver. The foregoing considered operational conditions encountered in practice place a practical limit of perhaps two or possibly three conventional relays which may appear in a transmission circuit in series relation to one another. The reason for this is that varying conditions of signal line current, characteristic pulse waveform distortion or inductive reaction of each successive relays signal winding, or other prevailing factors, may cause one relay of conventional construction to alter considerably the characteristics of the signal as it is transmitted beyond the one relay to the next succeeding relay so that the signal received and repeated by the first relay may be substantially different from that received and repeated by each succeeding relay. Each such relay serially positioned in a transmission line only compounds the difficulties of maintaining the correct desired mark to space ratio at any other relay installation.

It is an object of the present invention to provide a new and improved pulsating electrical current repeater and one which avoids one or more of the disadvantages and limitations of prior repeaters.

It is a further object of the invention to provide a novel pulsating electrical current repeater which permits easily and readily effected manual selection and adjustment at any time or from time to time of the values of applied currents or voltages at which the tongue contact transfer between stationary contacts of a given electromagnetic rely structure, thus enabling ready calibration and change of calibration of the given relay structure but without need of any adjustment or adjustments of the latter itself. Accordingly, a repeater embodying the invention enables ready compensation in communication systems for many varying factors prevailing in the operational conditions of any given communication transmission line and permits ready establishment and maintenance of mark and space transfer points to be within a few percent of the same value of line current, thereby providing higher operational stability and greater margin of reliability of the communication system at higher code transmission speeds while reducing the sensitivity to critical timing requirements of the system.

It is an additional object of the invention to provide an improved pulsating electrical current repeater which while operating in a communication system exhibits substantially improved insensitivity to widely varying values of line signal current above a selected minimum value, thus to render the system relatively insensitive to changes of system operational conditions such as changes of transmission line leakage or distributed capacitance such as might be affected by prevailing weather conditions.

It is yet another object of the invention to provide a pulsating electrical current repeater which presents a substantially purely resistive input circuit impedance, such as to a transmission line, and thus one which when used in a communication system enables a substantially larger number of such repeaters to be serially arranged in the transmission line without alteration of the line operational characteristics or without significant modifications of the signal pulse waveform as it travels down the line past one repeater after another, thereby insuring uniformity of the signal repeated by each repeater included in the transmission line.

It is a further object of the invention to provide an improved pulsating electrical current repeater having high reliability and operational stability while minimizing the need for supervisional adjustments and operational maintenance.

Figure 2:
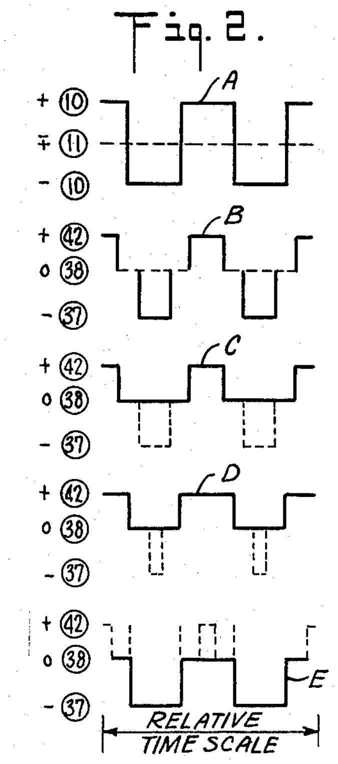
Figure 3:
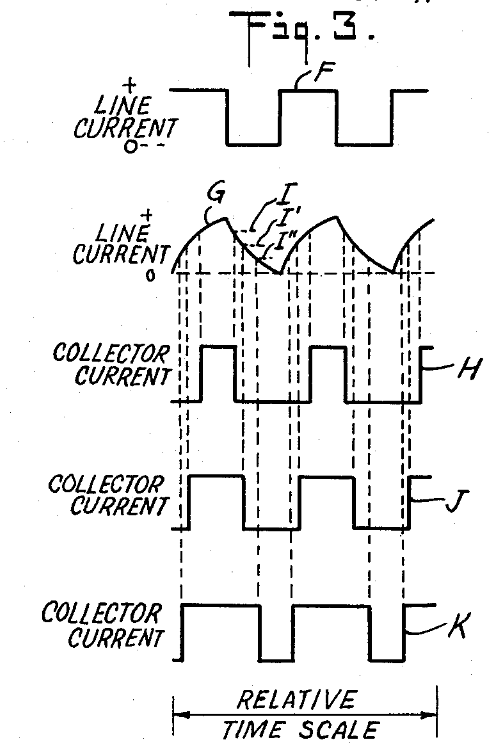
Figure 4:
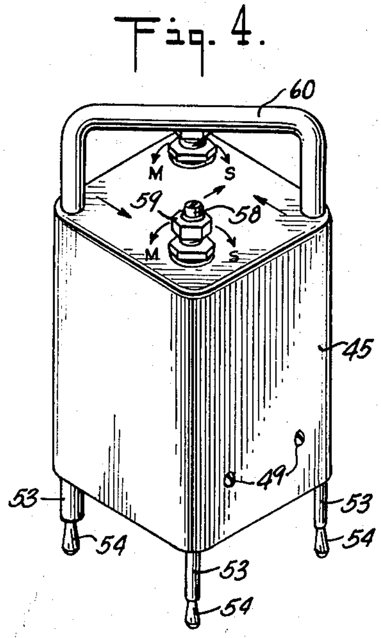

Other objects and advantages of the invention will appear as the detailed description thereof proceeds in the light of the drawings forming a part of this application and in which:

FIG. 1 is a circuit diagram of a pulsating electrical current repeater embodying the present invention, and FIGS. 2 and 3 graphically represent certain operating conditions of the FIG. 1 repeater and are used as an aid in explaining its operation; and FIGS. 4–7 illustrate certain described aspects of the physical construction of a repeater embodying the present invention.

Referring now more particularly to FIG. 1, the repeater includes input terminals 10 and 11 adapted to be connected to a signal transmission line and to be energized with a pulsating electrical signal current to be repeated. An input shunt circuit including a resistor 12 may be connected upon closure of a switch 13 across the input terminals 10 and 11 should the operating signal current exceed a value of approximately 25 milliamperes. Also connected between the input terminals 10 and 11 is a series circuit including a resistor 14 and a diode rectifier device 15 polarized to provide a conductive shunt across the input circuit, effective to maintain uniform input impedance, for the polarized type of signal transmission where reversal of current occurs in the transmission line during each space interval.

A transistor 16, shown by way of example as one of the PNP type, has an emitter 17 connected to the input terminal 10, and has a base electrode 18 connected through a diode rectifier device 19 and a current limiting resistor 20 to the movable contact 21 of a potentiometer 22 connected between the input terminals 10 and 11 to be energized with the electrical current supplied to the latter by the transmission line. The transistor 16 has a collector electrode 23 which is connected through a diode rectifier device 24, preferably of the silicon type, and the operating solenoid 25 of an electro-mechanical relay 26 to the movable contact 27 of a potentiometer 28 also connected between the input terminals 10 and 11 for energization by the electrical signal current supplied to the input terminals. The diode rectifiers 19 and 24 are connected with the polarities shown to permit normal transistor current flow in the circuits of the base electrode 18 and collector electrode 23, and a diode rectifier device 29 is connected in series with a resistor 30 across the solenoid 25 to suppress the inductive voltage appearing across the terminals of the winding 25 each time that current flow through the latter is interrupted.

The electro-mechanical relay 26 preferably is of the mercury-wetted contact relay type, such as those marketed by C. P. Clare & Company of Chicago, Ill., but can be of any other conventional type. The relay includes a transfer tongue contact 31 which is normally biased to engage a fixed space contact 32 but is actuated upon energization of the solenoid 25 to engage a fixed mark contact 33. A series arc suppression network of conventional form including a resistor 34 and a condenser 35 is connected between the movable tongue contact 31 and each of the fixed contacts 32 and 33. The movable tongue contact 31 and fixed space contacts 32 and 33 are connected through respective output terminals 37, 38 and 39 and through series current limiting resistors 40 and 41 and a common battery 42 to repeater output control circuits 43 and 44 as shown.

The operation of the FIG. 1 repeater will now be considered with reference to FIG. 2 which graphically represents certain operating conditions. Each time that a mark current pulse is applied to the input terminals 10 and 11, it is desirable that the resultant voltage impressed between the base electrode 18 and emitter electrode 17 of the transistor 16 shall be sufficient to cause the transistor to operate at current saturation so that the current flow to the collector electrode 23 is then limited only by the internal impedance of the transistor 16. The inherent non-linear conductive characteristic of the diode rectifier 19, however, prevents any substantial current flow through the transistor 16 until the base to emitter voltage exceeds approximately $\frac{6}{10}$ volt; that is, the diode rectifier 19 conductance characteristic is such that its conductivity increases relatively slowly up to a value of impressed voltage of approximately $\frac{6}{10}$ volt but increases much more rapidly for larger values of conductivity. This conductive characteristic of the rectifier device 19 causes the transistor 16 to be rendered fully conductive, or to be "triggered" into full conductivity, by any value of base to emitter voltage slightly in excess of $\frac{6}{10}$ volt. Since the potentiometer 22 is energized by the mark signal line current, the amplitude of line current required to develop a potential drop in excess of $\frac{6}{10}$ volt between the movable contact 21 and the emitter terminal 22*a* of the potentiometer 22 varies with the adjusted position of the movable contact 21 along the resistive element of the potentiometer 22 so that adjustments of the contact 21 enable ready adjustment of the "trigger" level of signal current which will render the transistor 16 fully conductive at its current saturation value.

The potentiometer 28 is also energized by the line signal currents, and adjustment of the movable contact 27 of this potentiometer adjusts the value of voltage of the collector electrode 23 with respect to the emitter electrode 17 during each mark signal pulse. The potentiometer 28 thus provides a bias control adjustment which adjusts the value of collector current flowing through the solenoid winding 25 of the relay 26 in relation to the magnitude of the mark line signal pulse which will cause transfer of the movable tongue contact 31 into engagement with the fixed mark contact 33 of the relay. Here again, the non-linear conductive characteristic of the diode rectifier 24 enhances the "triggered" conductive state of the transistor 16 to establish a more precise value of mark line current which will cause operation of the relay 26 to close its contacts 31 and 33. The diode rectifier 24 also serves two additional useful functions. One is to prevent possible puncture of the transistor 16 by the inductive voltage developed across the solenoid winding 25 each time that current through the latter is interrupted, and the other is to prevent reverse bias of the transistor collector electrode 23 whenever the polarity of the input voltage applied to the terminals 10 and 11 causes the terminal 11 to have positive polarity relative to the terminal 10.

Curve A of FIG. 2 graphically represents alternating mark and space signal current pulses of rectangular waveform as generated by a telegraph transmitter equipment for application to a transmission circuit. The circled numerals appearing at the left of curve A represent the input terminals 10 and 11 of the FIG. 1 repeater, curve A being shown in solid lines as of the polar signal type wherein mark pulses are represented by positive current flow through the transmission line and space pulses by negative current flow through the line. A neutral transmission system is one wherein the mark pulses are also represented by a positive current flow through the transmission line but wherein the space pulses are represented by absence of current flow in the line and thus would have a value represented by the broken line axis of curve A. The FIG. 1 repeater system treats a polar signal applied to the input terminals 10 and 11 as though the signal were a neutral one. This is for the reason that the emitter and base electrodes 17 and 18 of the transistor 16 are reverse biased during each polar negative-polarity space pulse, and the transistor thus is non-conductive in the same manner as though no signal current flowed in the line during the space intervals. Also during the negative space pulse of a polar signal, the diode rectifier 15 becomes conductive to maintain the input circuit impedance (established essentially by the value of the resistor 14) the same as for positive mark pulses and to shunt the applied input current around the input circuit.

The bias control potentiometer adjustable contact 27 is initially adjusted such that, with a signal of the curve A waveform applied to the input terminals 10 and 11, the transfer tongue contact 31 alternately engages the fixed contacts 32 and 33 to complete the electrical continuity of the output circuits 43 and 44 for equal time intervals as represented by curve B of FIG. 2. The short intervals during which neither of these output circuits is electrically completed represents the time of about one millisecond required for the movable tongue contact 31 to move from engagement with the space contact 32 to engagement with the mark contact 33 and vice versa. Curve C of FIG. 2 thus represents the current energization of the output circuit 44 for a neutral type of output circuit operation, and it will be seen that the duration of each mark pulse is appreciably shorter than the duration of each space pulse due to the tongue contact transfer transit time just mentioned. To compensate for this transit time and restore equality between the mark and space intervals, the bias control contact 27 is adjusted toward the end 28*b* of the bias potentiometer 28 until energization of the output circuit 44 by alternate mark and space code bits is that represented by curve D. If the output circuit 43 is used as the neutral output circuit of the repeater, compensation of the tongue contact transit time to obtain equality of the mark and space intervals is effected by adjusting the adjustable contact 27 toward the end 28*a* of the bias potentiometer 28 until the mark to space interval ratio of the output circuit 43 is that represented by curve E of FIG. 2.

As previously noted, the trigger level potentiometer 22 adjusts the amplitude value of the input signal mark current pulse at which the transistor 16 is triggered into and out of its conductive state. To illustrate the effect of this operational adjustment of the repeater, assume that a neutral signal of alternate mark and space signal bits is generated at the signal source as represented by curve F of FIG. 3. Curve G of FIG. 3 represents a typical waveform of this generated signal after transmission through a transmission circuit of long length and characterized by relatively poor transmission characteristics giving rise to substantial distortion of the waveform of each mark pulse. The waveform degradation is represented as being so severe that the rise time of the mark current pulse is substantially prolonged and barely reaches maximum amplitude during the mark interval whereas the fall time of the mark pulse likewise is prolonged through the succeeding space interval and just about reaches zero value in the time of one space bit. If the trigger level potentiometer 22 is so adjusted, by adjustment of the movable contact 21 toward the end 22*a* of the potentiometer resistive element, that the mark signal pulse at the input terminals 10 and 11 of the repeater must have a value in excess of the value I of curve G to trigger the transistor 16 into its conductive state, the corresponding intervals of collector current flow are then represented by curve H of FIG. 3. For this adjustment of the trigger level potentiometer 22, the mark intervals are appreciably less than the space intervals. This inequality of the mark and space intervals is corrected by adjustment of the trigger level bias control potentiometer contact 21 toward the end 22*b* of the potentiometer 22 to attain triggered control of collector current flow by a lesser amplitude I′ of mark current. The resultant operation is represented by curve J, where it will be seen that mark and space intervals are now equal. Continued adjustment of the movable contact 21 in the same direction as last described modifies the collector current flow characteristic to that represented by curve K where it will be seen that the mark intervals are now appreciably longer than the space intervals, an operation corresponding to the triggering of the transistor 16 at a relatively low signal current such as that having the value I″ of curve G.

It will be apparent from the foregoing description of the invention that a repeater or relay system embodying the invention possesses certain important and unique operational characteristics and constructional advantages. First and perhaps foremost is the fact that it is adapted for operation with a relatively wide range of values of current energization applied to its input terminals 10 and 11 and yet may be quite easily, readily, and stably adjusted to attain precise "pick up" (closure of normally open relay contacts) and "drop out" (reopening of the normally open contacts) relay operation at desired and relatively small-difference values of this input current. For example, assume that the relay 26 itself picks up on four milliamperes of current and drops out on one milliampere of current. By proper adjustment of the bias potentiometer 28 and the trigger potentiometer 22, the relay 26 may now pick up when the current supplied to the input terminals 10 and 11 has a value of say thirty-two or more milliamperes and may now drop out when the input current has a value of twenty-eight or less milliamperes (a current difference of only about 88.5%). As will presently be explained and described more fully, the repeater or relay system may be fabricated as a unitary structure within a small and compact housing having the bias and trigger controls externally accessible for adjustment. Consider what this means to a relay manufacturer. It has heretofore been necessary for the manufacturer to build and stock a large number of relay models each designed and constructed for operation at particular (and usually widely different) values of pick up and drop out currents, or at best adjustable over only a relatively narrow range of such currents. By use of the invention, the relay manufacturer need now build and stock only one basic relay unit using an electromagnetic relay requiring only a relatively small operating current, and this basic unit may then replace a large number of relay models previously manufactured to meet particular needs. This basic unit, by reason of the ready availability of electrical bias and trigger adjustments made by the manufacturer prior to delivery to the customer or by the latter after delivery, not only fully replaces the large number of relay models previously found necessary in a manufacturer's line but does so without even slight impairment of the operational pick up and drop out characteristics desired. In fact, the basic relay unit may in certain instances even provide improved operational characteristics not heretofore readily attainable, such as narrowing the difference and establishing more precise values between the pick up and drop out operating current values or enabling the same relay unit to be operated in any of several different physical orientations as where the force of gravity acting on the movable contact structure would in the case of prior relay structures so modify their operational characteristics as to limit use of the relay to a particular orientation. Further, the abruptly triggered operation effected at each operating current value selected by adjustment of the trigger potentiometer 28 enables the latter to provide a convenient and precise compensation control for differences in the values of spring bias, magnetic bias, or electrical bias found in any given model of electromagnetic relay used in the repeater or relay system of the invention when the relay is manufactured to the usual tolerances which take into account the difficulty in setting or predetermining the value of bias with certainty.

It will further be apparent that when a repeater or relay system embodiying the invention is used in a telegraph application as particularly described in connection with FIG. 1, the repeater greatly enhances the telegraph system operating characteristics in that the repeater possesses a desirably abrupt character of triggered operation in response to each mark signal pulse (the transistor 16 changing abruptly between its fully saturated conductive state and its non-conductive state) and thereby substantially equalizes the particular amplitude values of the mark signal pulses which effect transfer of the relay contacts. This is especially desirable under operating conditions giving rise to substantial degradation of waveform of the mark signal pulses, such as is represented by curve G of FIG. 3. In this application the repater also contributes the important operational advantage that the equality between the mark and space intervals of signal pulses received and repeated may be readily adjusted by adjustment of the bias potentiometer 28 and trigger level potentiometer 22 to compensate for numerous and diverse operational conditions encountered in practice.

The repeater presents a substantially pure resistive impedance at its input terminals 10 and 11, by reason of which a larger number of such repeaters may be connected in series in a telegraph transmission circuit without impairment of the waveform of transmitted mark pulses by one repeater wtih respect to a more remotely situated repeater in the transmission circuit or without significant change of any operating characteristic of the transmission line circuit. The number of repeaters which accordingly may be used in series is determined only by the ability of the transmitter voltage to produce mark current pulses of adequate current value in the transmission circuit.

The repeater is conveniently constructed as a pluggable unitary structure as illustrated in FIGS. 4–7. This structure includes a housing 45 having one end closed by a planar base member 46 of insulating material which supports the several external electrical pin terminals 10, 11, 37, 38, and 42 of the repeater. The housing 45 is preferably drawn from a metal for reasons of protective strength and electrical shielding. In this, and by reason of the externally accessible bias and trigger control adjusting shafts presently to be described, the housing may be of a ferromagnetic metal since any effect of the housing on the magnetic balance of the enclosed relay structure may readily be compensated by adjustment of the bias and trigger controls. Thus choice of the housing material is not limited to plastic or other insulating materials or non-magnetic metals as in the case of housings heretofore used to enclose electromagnetic relay devices. The base member 46 is spaced by a plurality of cylindrical spacers 47 from a metallic diaphragm 48 which is secured within the housing 45 by machine screws 49. The metallic diaphragm 48 cooperates with a metallic form of housing 45 to provide a completely enclosed electrical shield (which may be connected to an electrical ground through one of the terminals last mentioned) effective to shield against radiation from nearby sources of radio frequency interference. A planar member 50 of insulating material is also spaced by cylindrical spacers 51 from the diaphragm 48 and is maintained in assembled relation therewith by machine screws 52 which extend through the members 46, 48 and 50 and the spacers 47 and 51 and are threaded into locating studs 53.

The locating studs 53 are positioned at the corners of the member 46 and are received by locating apertures of a conventional pluggable-relay receptacle, not shown, which supports the repater structure and has electrical contacts engaging the terminals 10, 11, 37, 38 and 42 of the repeater to complete external electrical circuits thereto. The locating studs 53 have a narrowed waist portion 54 near their ends which cooperate with detent structures of the receptacle to retain the repeater in position in the receptacle, and two of the locating studs 53 have larger diameter as shown to insure a preselected pluggable orientation of the repeater with respect to the receptacle.

Figure 5:
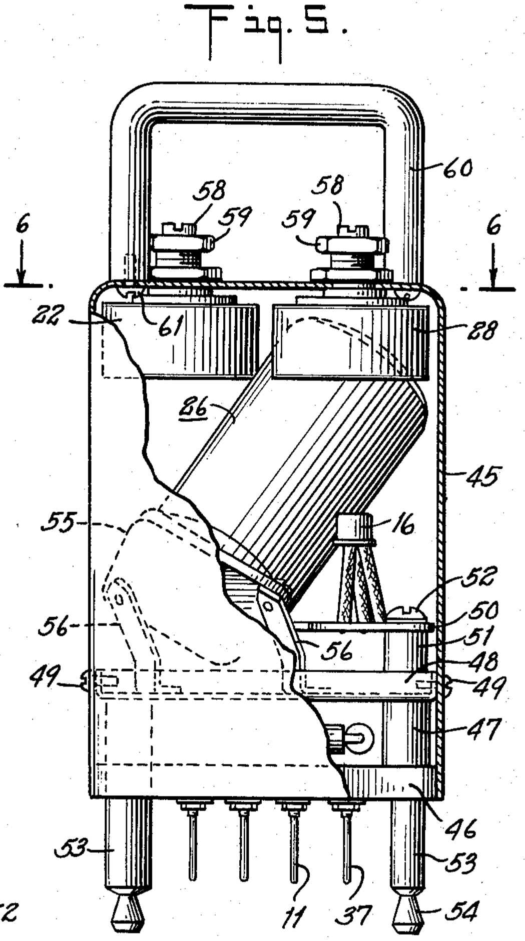
Figure 6:
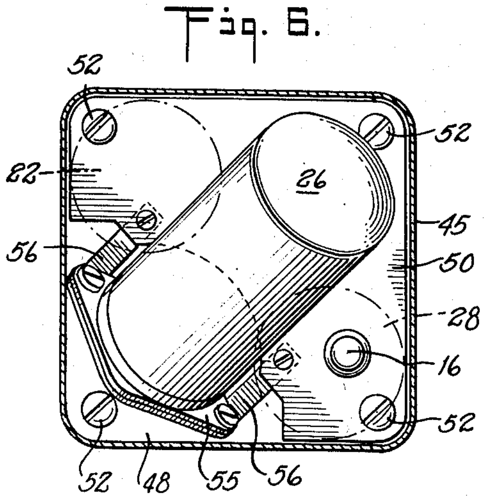
Figure 7:
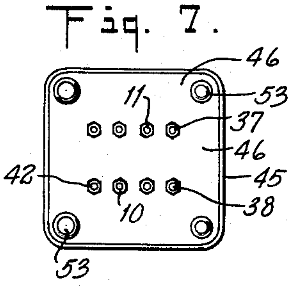

The relay 26 is constructed within a hermetically sealed cylindrical metal housing and is provided with external end terminals, not shown, which are received by an electrical socket 55 supported by brackets 56 from the diaphragm 48. As thus supported, the longitudinal axis of the relay 26 projects at an angle of approximately 53° from the plane of the diaphragm 48 so that the movable tongue contact of the relay projects upwardly at this angle when the repeater structure is supported for operation either in a vertical position as illustrated in FIG. 5 or in a horizontal position with the orientation illustrated in FIG. 6. It has heretofore been considered necessary to operate this mercury-wetted contact type of relay with its movable tongue contact projecting upwardly and oriented at an angle to a horizontal plane not substantially less than 90° to insure that the pool of liquid mercury in the relay shall not directly short the tongue contact to each of its associated fixed contacts but rather that only a capillary film of mercury shall be present to complete the electrical engagement as the tongue contact is moved into engagement with each of the fixed contacts. Applicant has found, however, that the mounting of the mercury-wetted contact type of relay at the approximately 53° angle earlier mentioned enables the relay to operate without impairment of its operating characteristics while at the same time permitting unitary repeater structure to be operated in either a vertical position or an oriented horizontal position as earlier mentioned. While this angle of orientation of the relay 26 in the unitary repeater structure also minimizes changes of gravitational pull on the movable tongue contact without regard to whether the unitary repeater structure is operated vertically or horizontally, it may be noted that any residual gravity effect acting with or against the tongue bias force may be readily compensated externally of the repeater structure by suitable adjustment of the bias potentiometer 28. This is likewise true with respect to bias changes occasioned when a relay using fixed magnetic bias is assembled within a metallic housing 45 formed of a ferromagnetic material.

The bias control potentiometer 28 and the trigger level control potentiometer 22 are supported on one end of the housing 45 as shown and have externally accessible rotatable adjusting shafts 58 with end slots for screw driver adjustment of their movable contacts, conventional lock nuts 59 being provided to lock each of the shafts 58 in adjusted position. The electrical components of the repeater are mounted upon the base member 46, the diaphragm member 48, and the planar member 50 as illustrated in connection with the transistor 16. A handle 60 is secured to the end of the housing 45 by machine screws 61 to facilitate pluggable insertion and withdrawal of the unitary repeater structure from its cooperating receptacle earlier mentioned.

While a specific form of invention has been described for purposes of illustration, it is contemplated that numerous changes may be made without departing from the spirit of the invention.

What is claimed is:

1. A control system comprising an input circuit adapted to be energized with an electrical control current of variable amplitude, a potentiometer having a contact adjustable along the length of a resistive element connected across said input circuit, a device having a nonlinear conductive impedance characteristic, a transistor having a collector electrode and having emitter and base electrodes operatively energized by connection thereof through said device between said adjustable contact and one side of said input circuit to render said emitter and collector electrodes relatively abruptly conductive upon attainment of an amplitude value of said current preselected by the adjusted position of said contact along said resistive element, and means having an energizing winding connected between said collector electrode and the other side of said input circuit for energization of said winding from said input circuit through said transistor.

2. A control system comprising an input circuit adapted to be energized with an electrical control current of variable amplitude, a potentiometer having a contact adjustable along the length of a resistive element connected across said input circuit, a device having a nonlinear conductive impedance characteristic, a transistor having a collector electrode and having emitter and base electrodes operatively energized by connection thereof through said device between said adjustable contact and one side of said input circuit to render said emitter and collector electrodes relatively abruptly conductive upon attainment of an amplitude value of said current preselected by the adjusted position of said contact along said resistive element, a second device having a non-linear conductive impedance characteristic, and an electro-magnetic relay having an energizing winding connected through said second device between said collector electrode and the other side of said input circuit for nonlinear energization of said winding from said input circuit through said transistor.

3. A control system comprising an input circuit adapted to be energized with an electrical control current of variable amplitude, a pair of potentiometers each having a contact adjustable along the length of a resistive element connected across said input circuit, a device having a non-linear conductive impedance characteristic, a transistor having a collector electrode and having emitter and base electrodes operatively energized by connection thereof through said device between the adjustable contact of one of said potentiometers and one side of said input circuit to render said emitter and collector electrodes relatively abruptly conductive upon attainment of an amplitude value of said current preselected by the adjusted position of said contact along said resistive element of said one potentiometer, and means having an energizing winding connected between said collector electrode and the adjustable contact of the other of said potentiometers for energization of said winding from said input circuit through said transistor and an adjustable portion of said other potentiometer.

4. A control system comprising an input circuit adapted to be energized with an electrical control current of variable amplitude, a potentiometer having a contact adjustable along the length of a resistive element connected across said input circuit, a unidirectional-current nonlinear conductive device, a transistor having a collector electrode and having emitter and base electrodes operatively energized by connection thereof through said device and between said adjustable contact and one side of said input circuit to render said emitter and collector electrodes relatively abruptly conductive upon attainment of an amplitude value of said current preselected by the adjusted position of said contact along said resistive element, and means having an energizing winding connected between said collector electrode and the other side of said input circuit for energization of said winding from said input circuit through said transistor.

5. A control system comprising an input circuit adapted to be energized with an electrical control current of variable amplitude, a potentiometer having a contact adjustable along the length of a resistive element connected across said input circuit, a unidirectional-current nonlinear conductive device, a transistor having a collector electrode and having an emitter electrode connected to one side of said input circuit and a base electrode coupled through said device to said adjustable contact to render said emitter and collector electrodes relatively abruptly conductive upon attainment of an amplitude value of said current preselected by the adjusted position of said contact along said resistive element, and means having an energizing winding connected between said collector electrode and the other side of said input circuit for energization of said winding from said input circuit through said transistor.

6. A relay system comprising an input circuit adapted to be energized with an electrical current, a pair of potentiometers each having a contact adjustable along the length of a resistive element connected across said input circuit, a pair of unidirectional current conductive devices, a transistor having a collector electrode and having emitter and base electrodes conductively connected through one of said devices between said adjustable contact and one side of said input circuit, and an electromagnetic relay having an energizing winding conductively connected through the other of said devices between said collector electrode and the other side of said input circuit for energization from said input circuit through said transistor.

7. An electrical current repeater comprising an input circuit adapted to be energized with an electrical current of variable amplitude to be repeated; a potentiometer having a contact adjustable along the length of a resistive element connected across said input circuit; a diode rectifier device; a resistor; a transistor having a collector electrode, an emitter electrode connected to one side of said input circuit, and a base electrode coupled to said adjustable contact through a series circuit including said diode rectifier device and said resistor, operatively to energize said emitter and base electrodes through said diode rectifier device by a proportionate value of said current as selected by the adjusted position of said contact along said resistive element; and a relay device having an energizing winding connected between said collector electrode and the other side of said input circuit and including contacts actuated by said winding and adapted to control the current energization of at least one repeater output circuit.

8. An electrical current repeater comprising an input circuit adapted to be energized with an electrical current of variable amplitude to be repeated; a potentiometer having a contact adjustable along the length of a resistive element connected across said input circuit; a pair of diode rectifier devices; a resistor; a transistor having a collector electrode, an emitter electrode connected to one side of said input circuit, and a base electrode coupled to said adjustable contact through a series circuit including one of said diode rectifier devices and said resistor operatively to energize said emitter and base electrodes through said diode rectifier device by a proportionate value of said current as selected by the adjusted position of said contact along said resistive element; and a relay device having an energizing winding connected in series with the other of said diode rectifier devices between said collector electrode and the other side of said input circuit for energization during the conductive state of said transistor and including contacts actuated by said winding and adapted to control the current energization of at least one repeater output circuit.

9. A relay system comprising an input circuit adapted to be energized with an electrical control current of variable amplitude, a potentiometer having a contact adjustable along the length of a resistive element connected across said input circuit, a device having a non-linear conductive impedance characteristic, a transistor having a collector electrode and having emitter and base electrodes operatively energized by connection thereof through said device between said adjustable contact and one side of said input circuit to render said emitter and collector electrodes relatively abruptly conductive upon attainment of an amplitude value of said current preselected by the adjusted position of said contact along said resistive element, an electromagnetic relay having an energizing winding connected between said collector electrode and the other side of said input circuit for energization of said winding from said input circuit through said transistor, and a diode rectifier device connected in series with a resistor across said winding to suppress any reverse inductive voltage developed by said winding upon each deenergization thereof.

10. A control system comprising an input circuit adapted to be energized with an electrical control current of given polarity and of variable amplitude, a potentiometer having a contact adjustable along the length of a resistive element connected across said input circuit, a device having a non-linear conductive impedance characteristic, a transistor having a collector electrode and having emitter and base electrodes operatively energized by connection thereof through said device between said adjustable contact and one side of said input circuit to render said emitter and collector electrodes relatively abruptly conductive upon attainment of an amplitude value of said current preselected by the adjusted position of said contact along said resistive element, means having an energizing winding connected between said collector electrode and the other side of said input circuit for energization of said winding from said input circuit through said transistor, and a series circuit connected across said input circuit and including a resistor and a diode rectifier device polarized to be rendered conductive upon energization of said input circuit with current having a polarity opposite said given polarity.

11. A pulsating electrical current repeater comprising: an input circuit adapted to be energized with positive polarity electrical current pulses to be repeated; trigger-level and bias potentiometers each having a contact adjustable along the length of a resistive element connected across said input circuit; a transistor having a collector electrode, an emitter electrode connected to one side of said input circuit, and a base electrode coupled to the adjustable contact of said trigger-level potentiometer through a series circuit including a diode rectifier device and a resistor; a relay device having an energizing winding connected between said collector electrode and the adjustable contact of said bias potentiometer and including contacts actuated by said winding and adapted to control the current energization of at least one repeater output circuit; and a series circuit connected across said input circuit and including a resistor and a diode rectifier device polarized to be rendered conductive upon reverse polarity energization of said input circuit.

12. A pulsating electrical current repeater comprising: an input circuit adapted to be energized with a pulsating electrical current to be repeated; trigger-level and bias potentiometers each having a contact adjustable along the length of a resistive element connected across said input circuit; a transistor having a collector electrode, an emitter electrode connected to one side of said input circuit, and a base electrode coupled to the adjustable contact of said trigger-level potentiometer through a series circuit including a diode rectifier device and a resistor; and a relay device having an energizing winding connected in series with a diode rectifier device between said collector electrode and the adjustable contact of said bias potentiometer for energization of said winding during the conductive state of said transistor and including transfer contacts actuated by said winding and adapted to control alternately the current energizations of a pair of repeater output circuits.

13. An electrical relay comprising a housing having a planar base member and individually insulated external electrical pin terminals supported by said base member and extending perpendicular thereto, an input circuit connected to input ones of said terminals and adapted to be energized with an electrical current, a potentiometer supported within said housing and having a contact manually adjustable externally of said housing and along the length of a resistive element connected across said input circuit, a transistor supported within said housing by said base member and having electrodes including emitter and base electrodes connected between said adjustable contact and one side of said input circuit and a collector electrode, and a mercury-wetted-contact relay device supported within said housing by said base member and having contacts connected to output ones of said terminals including a movable contact extending at an angle of approximately fifty degrees with respect to an axis perpendicular to said base member and actuated by a relay energizing winding connected between said collector electrode and the other side of said input circuit.

14. An electrical relay comprising a housing having a planar base member and individually insulated external electrical pin terminals supported by said base member and extending perpendicular thereto, an input circuit connected to input ones of said terminals and adapted to be energized with an electrical current, trigger-level and bias potentiometers supported by said housing and each having a contact manually adjustable externally of said housing and along the length of a resistive element connected across said input circuit, a transistor supported within said housing by said base member and having electrodes including emitter and base electrodes connected between the adjustable contact of said trigger-level potentiometer and one side of said input circuit and a collector electrode, and a mercury-wetted-contact relay device supported within said housing by said base member and having contacts connected to output ones of said terminals including a movable contact extending at an angle of approximately fifty degrees with respect to an axis perpendicular to said base member and actuated by a relay energizing winding connected between said collector electrode and the adjustable contact of said bias potentiometer.

References Cited by the Examiner

UNITED STATES PATENTS

| | | | |
|---|---|---|---|
| 2,794,856 | 6/57 | Turner | 178—70 |
| 2,918,529 | 12/59 | Chittleburgh et al. | 178—70 |
| 2,977,543 | 8/61 | Britt | 178—70 |

ROBERT H. ROSE, *Primary Examiner.*